United States Patent
Lee et al.

(10) Patent No.: US 7,253,851 B2
(45) Date of Patent: Aug. 7, 2007

(54) PIXEL AND METHOD FOR PIXEL REPAIR

(75) Inventors: Seok-Lyul Lee, Taoyuan Hsien (TW); Tean-Sen Jen, Taoyuan Hsien (TW); Ming-Tien Lin, Lujhou (TW)

(73) Assignee: Hannstar Display Corp., Taipei (TW)

( * ) Notice: Subject to any disclaimer, the term of this patent is extended or adjusted under 35 U.S.C. 154(b) by 370 days.

(21) Appl. No.: 10/971,620

(22) Filed: Oct. 21, 2004

(65) Prior Publication Data

US 2005/0110915 A1    May 26, 2005

(30) Foreign Application Priority Data

Nov. 21, 2003 (TW) ............... 92132682 A

(51) Int. Cl.
*G02F 1/1343* (2006.01)
*G02F 1/1333* (2006.01)

(52) U.S. Cl. ............ 349/55; 349/54; 349/141; 349/192

(58) Field of Classification Search ........... 349/54, 349/55, 141, 192
See application file for complete search history.

(56) References Cited

U.S. PATENT DOCUMENTS

| 5,946,065 A * | 8/1999 | Tagusa et al. ............ 349/138 |
| 6,259,502 B1 | 7/2001 | Komatsu ............ 349/141 |
| 6,506,617 B1 | 1/2003 | Cheng ............ 438/22 |
| 6,515,720 B1 * | 2/2003 | Iizuka et al. ............ 349/39 |
| 2002/0163602 A1 | 11/2002 | Lee ............ 349/43 |

* cited by examiner

*Primary Examiner*—David Nelms
*Assistant Examiner*—Michael H. Caley
(74) *Attorney, Agent, or Firm*—Thomas, Kayden, Horstemeyer & Risley

(57) ABSTRACT

A pixel structure and repair method thereof. A through hole is formed in the common line. When the source/drain electrode of a thin film transistor is not electrically connected to a pixel electrode due to a polymer residue remaining in a contact hole, a first laser beam passes through the through hole to weld the source/drain electrode and the pixel electrode. The defective pixel can be thus repaired to display the original color. In addition, if the defective pixel fails due to a defective thin film transistor, the invention irradiates a second laser beam to sever the source/drain electrode such that the defective thin film transistor is not electrically connected to the pixel electrode. The defective pixel can be thus repaired to a dark point.

30 Claims, 4 Drawing Sheets

PIXEL AND METHOD FOR PIXEL REPAIR

BACKGROUND

The invention relates to a pixel design for a display device, and more particularly, to a pixel structure and a method of repairing a defective pixel of a liquid crystal display device.

Generally, a liquid crystal display (LCD) controls light transmittance using an electric field to display an image. In order to attain this end, the LCD includes a liquid crystal panel having liquid crystal cells arranged in a matrix, and a driving circuit for driving the liquid crystal panel. The liquid crystal panel is provided with pixel electrodes and a common electrode for applying an electric field to each liquid crystal cell. With regard to a TN (Twisted Nematic) mode LCD, the pixel electrode is provided on a lower substrate (also referred to as a TFT (thin film transistor) array substrate which substantially consists of a transparent substrate comprising a plurality of TFTs arranged in an array) for each liquid crystal cell, whereas the common electrode is integrally formed on the entire surface of an upper substrate. With regard to an IPS (In-Plane Switching) mode LCD, the pixel and common electrodes with an interlaced-comb structure are formed on the lower substrate. The lower substrate comprises gate, data and common lines thereon. The detailed structure of the IPS-LCD is disclosed in, for example, U.S. Pat. Nos. 6,259,502 and 6,506,617, and therefore is not described here again. In any LCD, pixel regions are defined by crossing gate and data lines. Each pixel electrode is connected to a TFT serving as a switching device. The pixel electrode drives the liquid crystal cell, along with the common electrode, in accordance with a data signal applied via the TFT.

In order to achieve higher brightness and resolution, HAR (high aperture ratio) and COA (color filter on array) techniques have been widely employed. These methods generally form a thick organic insulating layer with a thickness of 1~4 µm overlying the lower substrate (i.e. the array substrate). During formation of a contact hole with a high aspect ratio in the thick organic insulating layer, organic matter (e.g. polymer residue) is typically remains therein. This prevents pixel electrodes manufactured in subsequent processes from electrically connecting to the TFT, resulting defective pixel.

Current means of repairing defective pixels connects the pixel electrode to the TFT of the previous pixel, causing the repaired pixel to display the same color as the previous pixel. This method is disclosed in, for example, U.S. Application Publication No. 2002/0163602. Another repair method, known as the dark point repair technique, directly connects the pixel electrode to the data line or the common line, causing the defective pixel to display black or gray. Conventional techniques, however, cannot restore the original color of the defective pixel, thus suffers display quality.

SUMMARY

Embodiments of the invention provide a pixel structure of an LCD.

Embodiments of the invention further provide a method of repairing a defective pixel.

In order to achieve these aims, embodiments of the invention provide a pixel structure of a liquid crystal display. A transparent substrate is provided. A first metal layer having a first hole is formed on the transparent substrate, wherein the first hole exposes the transparent substrate. An insulating layer is formed on the first metal layer and the transparent substrate. A second metal layer is formed on the insulating layer. An organic insulating layer having a second hole is formed on the second metal layer, wherein the second hole is directly located above the first hole. A transparent electrode is formed on the organic insulating layer and extends into the second hole. When the second metal layer is not connected to the transparent electrode, a first laser beam passes through the first hole to weld the second metal layer and the transparent electrode in the second hole.

The pixel structure of embodiments of the invention further comprises a thin film transistor formed on the transparent substrate, wherein a source/drain region of the thin film transistor is electrically connected to the transparent electrode by means of the second metal layer. If the thin film transistor fails, however, irradiating a second laser beam severs the second metal layer such that the thin film transistor cannot be electrically connected to the transparent electrode.

Embodiments of the invention additionally provide a method of repairing a pixel. A first metal layer is formed on part of a transparent substrate. A first hole is formed to penetrate the first metal layer, wherein the first hole exposes the transparent substrate. An insulating layer covering the first metal layer and the transparent substrate is formed. A second metal layer is formed on the insulating layer. An organic insulating layer covering the second metal layer is formed. Part of the organic insulating layer is removed to form a second hole therein, wherein the second hole is located directly above the first hole. A transparent electrode is formed on the organic insulating layer and extends into the second hole. A first laser beam passes through the first hole to weld the second metal layer and the transparent electrode in the second hole.

A thin film transistor of embodiments of the invention is further formed on the transparent substrate, wherein a source/drain region of the thin film transistor is electrically connected to the transparent electrode by means of the second metal layer. If the thin film transistor fails, however, irradiating a second laser beam severs the second metal layer such that the thin film transistor cannot be electrically connected to the transparent electrode.

Embodiments of the invention improve on the conventional technology in that the first metal layer comprises a through hole (i.e. the first hole) formed therein. When the second metal layer is not connected to the transparent electrode, a first laser beam is passed through the through hole in the first metal layer to weld the second metal layer and the transparent electrode in the second hole. The defective pixel can be thus repaired to display the original color. Additionally, if the thin film transistor fails, a second laser beam irradiates and severs the second metal layer such that the source/drain region of the thin film transistor is not electrically connected to the transparent electrode. The defective pixel can be thus repaired to a dark (or gray) point. The pixel structure and repair method thereof according to embodiments of the invention can display the original or a dark color, thereby improving display quality and ameliorating disadvantages of the conventional technology.

BRIEF DESCRIPTION OF THE DRAWINGS

The invention can be more fully understood by reading the subsequent detailed description in conjunction with the examples and references made to the accompanying drawings, wherein.

DETAILED DESCRIPTION

A pixel structure and a pixel repair method are applicable to a liquid crystal display (LCD) device, such as TN mode LCD, IPS mode LCD and others. In order to simplify the illustration, a representative IPS mode LCD is illustrated, but is not intended to limit the disclosure.

Figure 1:
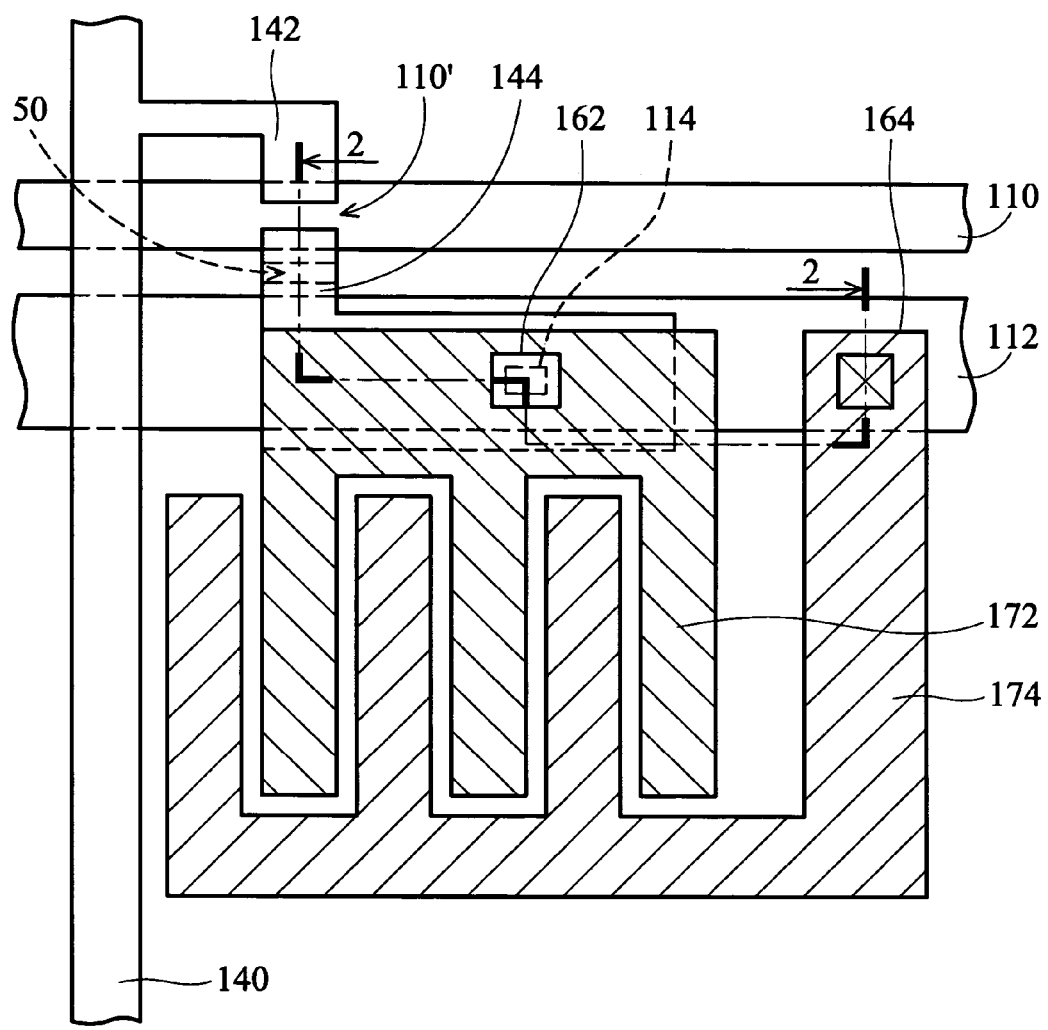
FIG. 1 is a top view of one pixel of an IPS-LCD according to an embodiment of the invention.
Figure 2A:
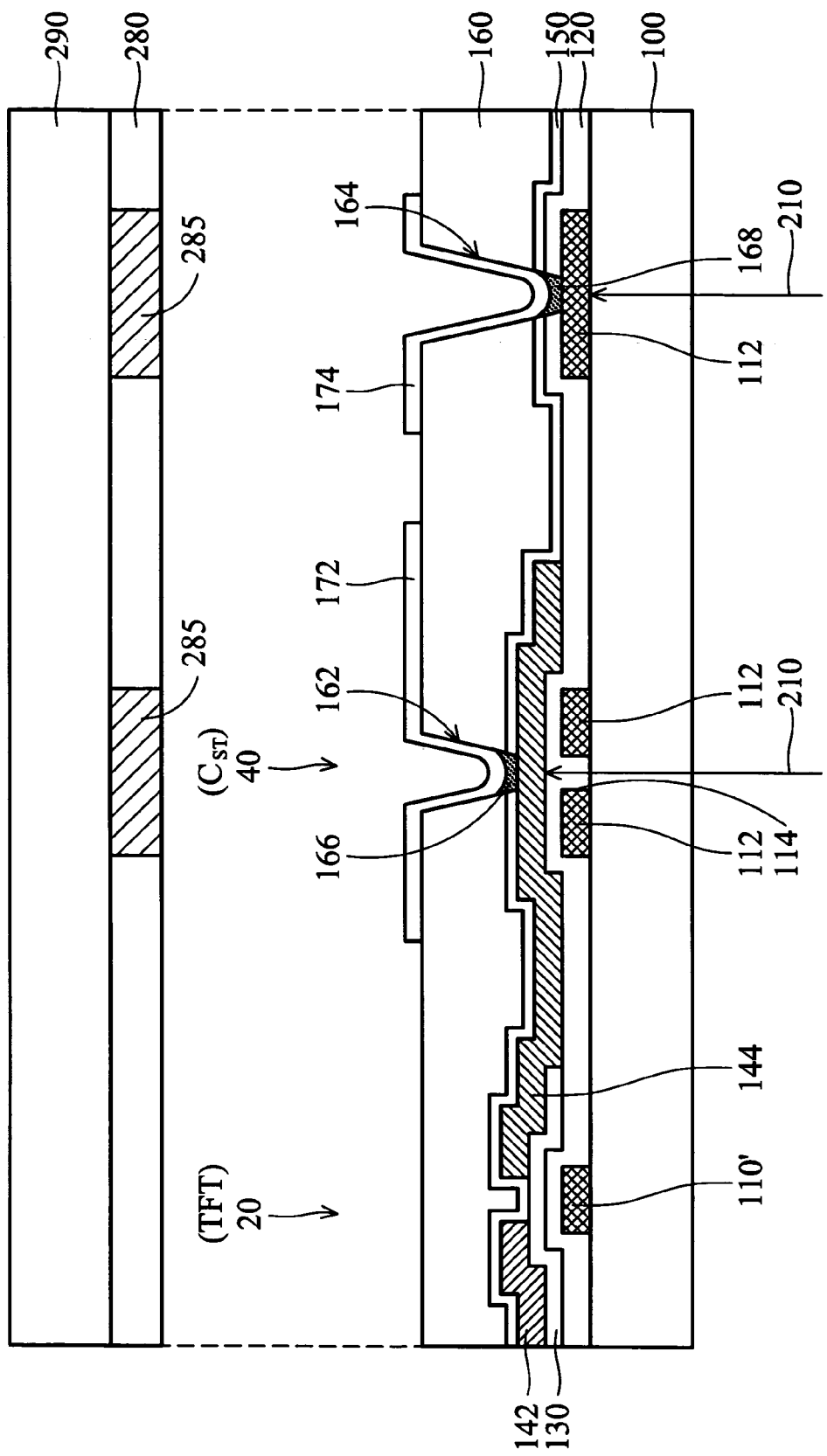
FIG. 2A is a sectional view of the IPS-LCD taken along line 2-2 in FIG. 1, illustrating a pixel repair method of an embodiment of the invention.
Figure 2B:
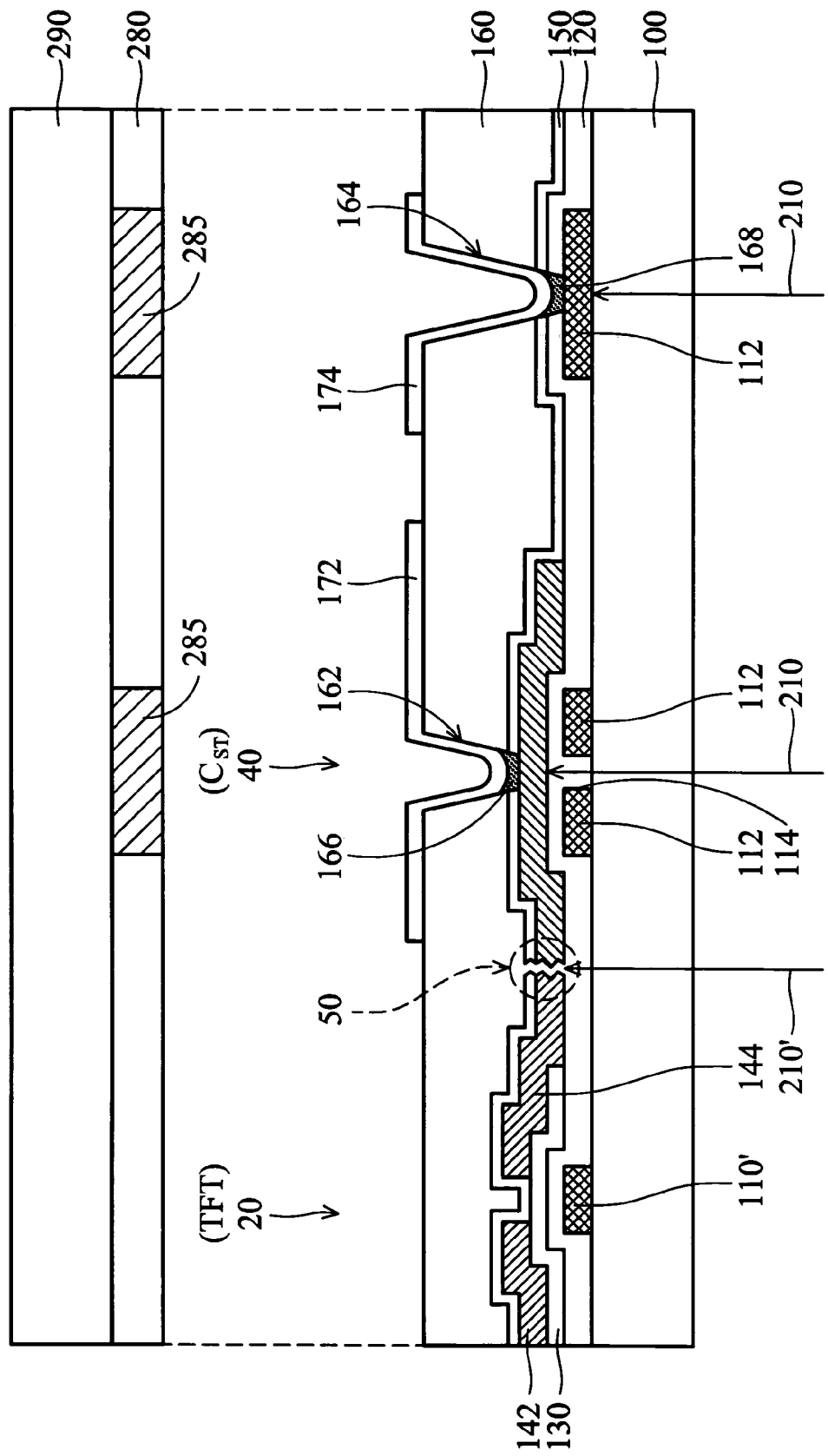
FIG. 2B is a sectional view of the IPS-LCD taken along line 2-2 in FIG. 1, illustrating another embodiment of a pixel repair method of the invention.

FIG. 1 is a top view of one pixel of an IPS mode LCD. FIG. 2A is a sectional view of the IPS mode LCD taken along line 2-2 in FIG. 1, illustrating a pixel repair method. FIG. 2B is a sectional view of the IPS mode LCD taken along line 2-2 in FIG. 1, illustrating another pixel repair method. As shown in FIG. 1, a gate line 110 and a data line 140 are formed on a transparent substrate 100 serving as a lower substrate 100, defining a pixel. Although a single pixel is drawn in FIG. 1, a liquid crystal display device typically comprises a plurality of pixels arranged in an array.

In FIGS. 1 and 2A, a common line 112 and the gate line 110 comprising a gate electrode 110' are formed on the transparent substrate 100. The common line 112 is parallel to the gate line 110. The transparent substrate 100 can be a glass substrate. The gate line 110 and the common line 112 can be simultaneously defined by the same deposition and photolithography procedures. The gate line 110 and the common line 112 comprises metal, such as Al, Cu, Ta, Ti or MoW.

It is important that a first hole 114 is simultaneously defined in the common line 112 during the formation of the gate line 110 and the common line 112. The first hole 114 penetrates the common line 112 and exposes the transparent substrate 100. The cross-section of the first hole 114 can be a 3 μm*3 μm square.

A gate insulating layer 120 covering the gate line 110 (comprising the gate electrode 110'), the common line 112 and the transparent substrate 100 is then formed. The gate insulating layer 120 can be $SiO_x$ or $SiN_x$ formed by chemical vapor deposition (CVD).

A semiconductor island 130, such as silicon, is formed on part of the gate insulating layer 120. The data line 140 (only shown in FIG. 1) is then formed on the transparent substrate 100, and simultaneously, an interchangeable source/drain electrode 142/144 is defined on part of the semiconductor island 120. A TFT (thin film transistor) region 20 is thus obtained in the pixel. In this example, symbol 142 denotes the drain electrode and symbol 144 denotes the source electrode. The drain electrode 142 is electrically connected to the data line 140. The data line 140 and the source/drain electrode 142/144 can be Al, Cu, Ta, Ti or MoW. Moreover, the source electrode 144 is extended onto part of the gate insulating layer 120 above the common line 112. A storage capacitor ($C_{ST}$) region 40 is thus obtained in the pixel.

A passivation layer 150 can then be formed over the transparent substrate 100 to cover the TFT region 20 and the $C_{ST}$ region 40. The passivation layer 150 can comprise $SiO_x$, $SiN_x$ or SiON formed by CVD. The thickness of the passivation layer 150 can be about 0.1~0.6 μm.

A thick organic insulating layer 160 is then formed on the passivation layer 150. A planarization procedure can be further performed on the organic insulating layer 160 to obtain a smooth surface. The organic insulating layer 160 can be a polymer layer formed by coating. The thickness of the organic insulating layer 160 typically exceeds 2.5 μm.

Next, an etching procedure is performed. A portion of the thick organic insulating layer 160 is etched to form a second hole 162 and a third hole 164. Noted that the second hole 162 is located directly above the first hole 114. During etching of the organic insulating layer 160, an organic residue 166, such as polymer residue, typically remains in the second hole 162 due to the high aspect ratio. Additionally, another organic residue 168, such as polymer residue, typically remains in the third hole 164.

A transparent pixel electrode 172 and a transparent common electrode 174 are simultaneously formed on part of the thick organic insulating layer 160. The pixel electrode 172 is extended into the second hole 162 and the common electrode 174 into the third hole 164. The pixel and common electrodes 172 and 174 are arranged in an interlaced-comb form. The pixel electrode 172 can be indium tin oxide (ITO) or indium zinc oxide (IZO). The common electrode 174 can be ITO or IZO. The pixel electrode 172, however, cannot be electrically connected to the underlying source electrode 144 in the second hole 162 due to organic residue 166 (i.e. the polymer residue), thereby causing a defective pixel.

Figure 3:
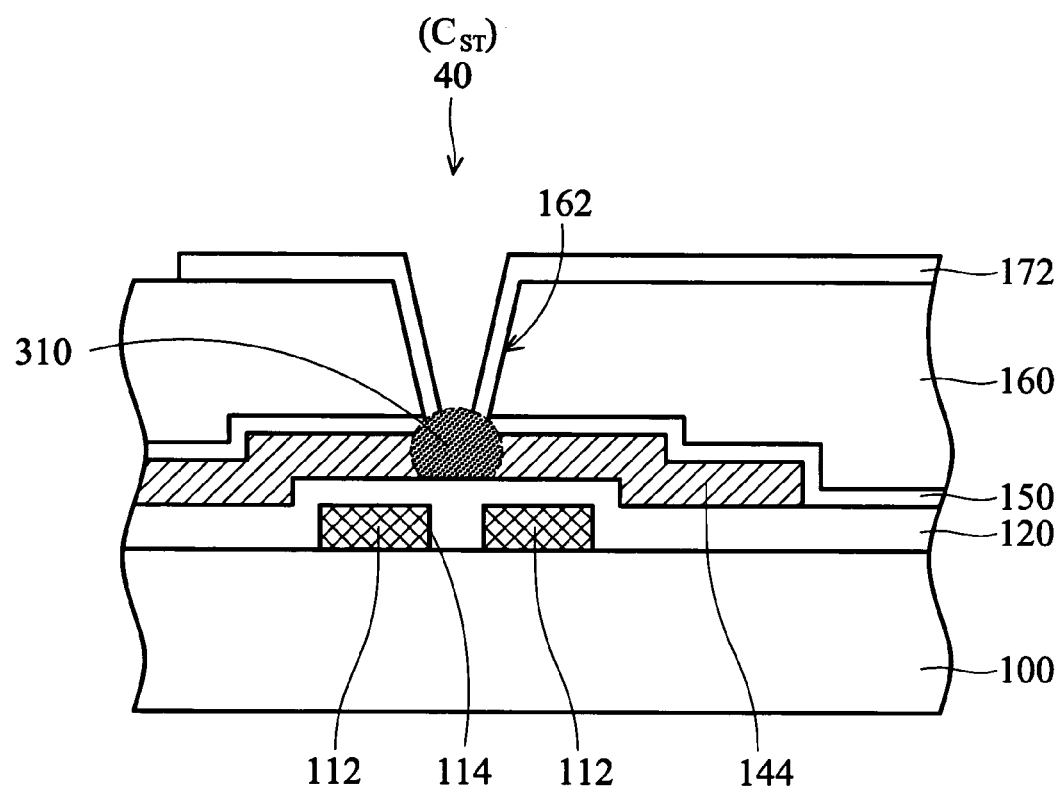
FIG. 3 is a sectional view showing a portion of the repaired pixel according to the method shown in FIG. 2A.

In order to repair the defective pixel, a laser beam 210 irradiates from under the transparent substrate 100. The laser beam 210 passes through the first hole 114 in the common line 112 to burn away the organic residue 166 in the second hole 162 and weld the source electrode 144 and the pixel electrode 172 in the second hole 162. Accordingly, referring to FIG. 3, the source electrode 144 is electrically connected to the pixel electrode 172. In FIG. 3, symbol 310 denotes a welding point.

As shown in FIG. 2A, the laser beam 210 can also burn away the organic residue 168 in the third hole 164 to weld the common line 112 and the common electrode 174 in the third hole 164.

In FIG. 2A, an upper substrate 290 opposite the transparent substrate 100 is provided. A color filter 280 is formed on the interior of the upper substrate 290. In order to prevent light leakage, the color filter 280 comprises black matrix areas 285 corresponding to the first and second holes 114 and 164.

Accordingly, the laser beam 210 passing through the first hole 114 in the common line 112 is employed to weld the source electrode 144 and the pixel electrode 172. Since the pixel electrode 172 is electrically connected to the original TFT in the repaired pixel, the repaired pixel can display its original color, thereby improving display quality.

The described method, however, cannot repair another pixel defect caused by TFT failure. FIG. 2B is a sectional view of the IPS-LCD taken along line 2-2 in FIG. 1, illustrating another pixel repair method.

In FIGS. 1 and 2B, the invention irradiates a second laser beam 210' to pass through the transparent substrate 100 and the gate insulating layer 120. The second laser beam 210' severs the metal wiring 144 (i.e. the source electrode) located at a severing position 50, wherein the severing position 50 is located between the gate line 110 and the common line 112. Thus, the defective TFT cannot charge or be electrically connected to the pixel electrode 172. Additionally, the electric leakage of liquid crystal causes the potential of the common electrode 174 surrounded by the pixel electrode 172 to be equal to that of the pixel electrode 172. The resultant equal potential allows the repaired pixel to display the dark (or gray) point.

Thus, embodiments of the invention provide a pixel structure and repair method thereof. The invention forms a through hole (i.e. the first hole 114) in the common line 112. When the source/drain electrode 144 cannot be connected to the pixel electrode 172 due to polymer residue 166 remaining in the contact hole 162, a first laser beam 210 passes through the through hole 114 to weld the electrodes 144 and 172. The defective pixel can be thus repaired to display the original color. Additionally, if the defective pixel fails due to a defective thin film transistor, a second laser beam 210' irradiates to sever the source/drain electrode 144 such that the defective thin film transistor cannot be electrically connected to the pixel electrode 172. The defective pixel can be thus repaired to a dark point. Accordingly, the repaired pixel can display the original or a dark color, thereby improving display quality and ameliorating disadvantages of the conventional technology.

While the invention has been described by way of example and in terms of the preferred embodiment, it is to be understood that the invention is not limited thereto. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A pixel structure of a liquid crystal display, comprising:
   a transparent substrate;
   a first metal layer comprising a first hole formed on the transparent substrate;
   an insulating layer formed on the first metal layer and the transparent substrate;
   a second metal layer formed on the insulating layer;
   an organic insulating layer having a second hole formed on the second metal layer and a third hole formed above the first metal layer, wherein the second hole is located directly above the first hole in order to provide a first laser beam passing through;
   a first transparent electrode formed on the organic insulating layer; and
   a second transparent electrode formed on the organic insulating layer extending into the third hole, wherein the second transparent electrode is a common electrode.

2. The pixel structure according to claim 1, further comprising a thin film transistor formed on the transparent substrate, wherein a source/drain region of the thin film transistor is electrically connected to the first transparent electrode by means of the second metal layer.

3. The pixel structure according to claim 2, wherein when the thin film transistor fails, the second metal layer is severed by irradiating a second laser beam such that the source/drain region of the thin film transistor is not electrically connected to the first transparent electrode.

4. The pixel structure according to claim 1, wherein the first and second metal layers comprise Al, Cu, Ta, Ti or MoW.

5. The pixel structure according to claim 1, wherein the first transparent electrode is a pixel electrode.

6. The pixel structure according to claim 1, wherein the first transparent electrode is an indium tin oxide (ITO) or indium zinc oxide (IZO) layer.

7. The pixel structure according to claim 1, wherein the insulating layer is a $SiO_x$ or $SiN_x$ layer.

8. The pixel structure according to claim 1, wherein the organic insulating layer comprises polymer.

9. The pixel structure according to claim 1, wherein a thickness of the organic insulating layer exceeds 2.5 µm.

10. The pixel structure according to claim 1, further comprising a passivation layer formed between the second metal layer and the organic insulating layer.

11. The pixel structure according to claim 10, wherein the passivation layer is a $SiO_x$, $SiN_x$ or SiGN layer.

12. The pixel structure according to claim 10, wherein a thickness of the passivation layer is 0.1~0.6 µm.

13. The pixel structure according to claim 1, wherein the transparent substrate is a glass substrate.

14. The pixel structure according to claim 1, wherein when the first metal layer is not electrically connected to the second transparent electrode, a third laser beam is provided to weld the first metal layer and the second transparent electrode in the third hole.

15. The pixel structure according to claim 1, wherein the first hole exposes the transparent substrate.

16. The pixel structure according to claim 1, wherein the first transparent electrode extends into the second hole.

17. A method of repairing a pixel, comprising the steps of:
   forming a first metal layer on part of a transparent substrate;
   forming a first hole to penetrate the first metal layer and expose the transparent substrate;
   forming an insulating layer to cover the first metal layer and the transparent substrate;
   forming a second metal layer on the insulating layer;
   forming an organic insulating layer to cover the second metal layer;
   removing part of the organic insulating layer to form a second hole therein, wherein the second hole is located directly above the first hole;
   forming a first transparent electrode on the organic insulating layer extending into the second hole;
   passing a first laser beam through the first hole to weld the second metal layer and the first transparent electrode in the second hole;
   forming a third hole in the organic insulating layer above the first metal layer; and
   forming a second transparent electrode on the organic insulating layer extending into the third hole, wherein the second transparent electrode is a common electrode.

18. The method according to claim 17, further comprising forming a thin film transistor on the transparent substrate, wherein a source/drain region of the thin film transistor is electrically connected to the first transparent electrode by means of the second metal layer.

19. The method according to claim 18, wherein when the thin film transistor fails, the second metal layer is severed by irradiating a second laser beam such that the source/drain region of the thin film transistor is not electrically connected to the first transparent electrode.

20. The method according to claim 17, wherein the first and second metal layers comprise Al, Cu, Ta, Ti or MoW.

21. The method according to claim 17, wherein the first transparent electrode is a pixel electrode.

22. The method according to claim 17, wherein the first transparent electrode is an indium tin oxide (ITO) or indium zinc oxide (IZO) layer.

23. The method according to claim 17, wherein the insulating layer is a $SiO_x$ or $SiN_x$ layer.

24. The method according to claim 17, wherein the organic insulating layer comprises polymer.

25. The method according to claim 17, wherein a thickness of the organic insulating layer exceeds 2.5 μm.

26. The method according to claim 17, further comprising forming a passivation layer between the second metal layer and the organic insulating layer.

27. The method according to claim 26, wherein the passivation layer is a $SiO_x$, $SiN_x$ or SiON layer.

28. The method according to claim 26, wherein a thickness of the passivation layer is 0.1~0.6 μm.

29. The method according to claim 17, wherein the transparent substrate is a glass substrate.

30. A method of repairing a pixel, comprising the steps of:
   forming a first metal layer on part of a transparent substrate;
   forming a first hole to penetrate the first metal layer and expose the transparent substrate;
   forming an insulating layer to cover the first metal layer and the transparent substrate;
   forming a second metal layer on the insulating layer;
   forming an organic insulating layer to cover the second metal layer;
   removing part of the organic insulating layer to form a second hole therein, wherein the second hole is located directly above the first hole;
   forming a first transparent electrode on the organic insulating layer extending into the second hole;
   passing a first laser beam through the first hole to weld the second metal layer and the first transparent electrode in the second hole;
   forming a third hole in the organic insulating layer above the first metal layer; and
   forming a second transparent electrode on the organic insulating layer extending into the third hole, wherein when the first metal layer is not electrically connected to the second transparent electrode, a second laser beam is provided to weld the first metal layer and the second transparent electrode in the third hole.

* * * * *